United States Patent Office 3,414,465
Patented Dec. 3, 1968

3,414,465
SEALED GLASS ARTICLE OF MANUFACTURE
Nils Tryggve E. A. Baak, Ridgefield, Conn., and Charles
F. Rapp, Toledo, Ohio, assignors to Owens-Illinois, Inc.,
a corporation of Ohio
No Drawing. Continuation-in-part of applications Ser. No.
465,381, June 21, 1965, and Ser. No. 517,071, Dec. 28,
1965. This application May 12, 1966, Ser. No. 549,459
20 Claims. (Cl. 161—193)

This application is a continuation-in-part of copending applications U.S. Ser. No. 517,071, filed Dec. 28, 1965, and U.S. Ser. No. 465,381, filed June 21, 1965, and now abandoned.

The present invention pertains to articles of manufacture and, more particularly, to optical articles comprising surfaces joined together by select sealing glasses. Specifically, the instant invention relates to fused quartz or fused silica articles formed of soldered fused quartz or fused silica parts.

Fused quartz and fused silica are widely known and employed in the electronic, research and optical arts, and for the purpose of this invention, fused quartz and fused silica are considered as essentially the same and similar results can be obtained with both. Among the important and desirable applications for fused quartz or fused silica in these arts are their employment for fabricating test tubes, spectrum tubes, tubular germicidal lamps, cuvettes, lenses, face plates for laser tubes, plates for frequency control and for various other articles of commerce. The manufacture of shaped used quartz or shaped fused silica devices often requires the joining of fused quartz or used silica parts by sealing glasses into a unitary composite article. The successful joining of fused parts for optical applications very often demands precise dimensions and the fabrication of distortion-free optical systems. For these and other reasons, sealing glasses which undergo significant changes in shape and dimensions during the fabrication soldering stage cannot be tolerated for joining fused parts. A critical need exists for acceptable sealing glasses for sealing fused quartz to fused quartz or the like surfaces. In our copending application, there are disclosed copper sealing glasses which possess desirable melting and low thermal expansion properties, and are, therefore, well suited for making fused-quartz-to-fused-quartz seals, fused quartz to metal seals and fused quartz sealed to like surfaces. It will be appreciated by those skilled in the art that if composite fused quartz or fused silica articles can be made by employing acceptable sealing glasses, the composite fused article would have a positive use and a definite commercial value. Likewise, it will be appreciated by those versed in the art that if fused silica or quartz articles of commerce can be manufactured without damaging the fused quartz or silica, said manufacturing process would represent a useful contribution to the art.

Accordingly, it is an object of this invention to provide a composite fused quartz or fused silica article.

Another object of this invention is to provide composite fused quartz or fused silica articles, said articles having any size and shape according to the purpose for which it will be subsequently employed.

Yet another object of this invention is to provide a composite fused quartz or fused silica article of commerce for use in the optical arts.

A still further object of this invention is to manufacture a composite fused quartz article or fused silica article wherein the parts forming said composite are intimately joined by a sealing glass having desirable thermal and expansion properties.

Yet a still further object of this invention is to provide a composite fused quartz article of commerce or a composite used silica article of commerce wherein the fused quartz parts of the composite article are joined by a copper sealing glass.

These and other objects of the invention will become apparent from a consideration of the accompanying disclosure and the claims.

The batch ingredients and the process for preparing the sealing glasses presently employed for this invention are fully disclosed in our copending application, Ser. No. 465,381. The novel sealing glass compositions are also disclosed and claimed in the above-mentioned application.

According to the present invention, the sealing glass compositions employed herein for forming fused quartz-to-fused quartz seals or fused silica-to-fused silica seals or the like contain silica, alumina and copper as the base ingredients, and the sealing glasses may also contain, in addition thereto, nickel, iron and/or fluorine. Generally, the vitreous sealing glasses contain, expressed in mole percent, about 50 to 94% $SiO_2$, about 0.5 to 30% $Al_2O_3$, and about 1.5 to 35% $Cu_2O$; a sealing glass comprising 50 to 94% $SiO_2$, 0.5 to 30% $Al_2O_3$, 1.5 to 35% $Cu_2O$ and 0 to 6% $AlF_3$. The sealing glasses of the present invention also include vitreous sealing glasses consisting essentially of 50 to 90% $SiO_2$, 5 to 30% $Al_2O_3$, 5 to 30% $Cu_2O$, about 0 to 6% NiO, about 0 to 6% $Fe_2O_3$, and 0 to 6% $AlF_3$; a glass containing 75 to 80% $SiO_2$, about 8 to 13% $Al_2O_3$, about 8 to 13% $Cu_2O$, 0 to 2.5% NiO, 0 to 2.5% $Fe_2O_3$, and 0 to 2.5% $AlF_3$; a glass containing 77 to 78% $SiO_2$, 9 to 10% $Al_2O_3$, 12 to 13% $Cu_2O$, and 1 to 2% $AlF_3$; and a glass containing 77% $SiO_2$, 9.25% $Al_2O_3$, 12.45% $Cu_2O$, and 1.3% $AlF_3$. The copper sealing glasses, as employed herein, generally have a coefficient of linear thermal expansion of not more than about $10 \times 10^{-7}/°$ C. (0–300° C.).

Another of the significant features of the sealing glasses is the relative low melting point and fluidity at relatively low temperatures. The viscosity data reported herein shows that the log viscosity of the liquidus point makes these glasses acceptable for working, and the copper glasses have desirable high temperature viscosity characteristics.

The following detailed tables contain examples of copper glass compositions that can be used for fused quartz-to-fused quartz seals. It is to be understood that cuprous or cupric oxide can be used interchangeably, provided equivalent amounts of copper are present.

TABLE I.—THERMAL EXPANSION AND COMPOSITION

[Mole percent]

| $\alpha \times 10^7$ (0–300°C.) | $SiO_2$ | $Al_2O_3$ | $Cu_2O$ | $Fe_2O_3$ | NiO |
|---|---|---|---|---|---|
| 6.9 | 77.5 | 12.5 | 10.0 | | |
| 5.1 | 77.5 | 10.0 | 12.5 | | |
| 6.9 | 65.0 | 17.5 | 17.5 | | |
| 6.1 | 85.0 | 7.5 | 7.5 | | |
| 7.3 | 75.0 | 7.5 | 17.5 | | |
| 5.1 | 79.0 | 8.5 | 12.5 | | |
| 7.2 | 82.5 | 12.5 | 5.0 | | |
| 5.4 | 87.5 | 5.0 | 7.5 | | |
| 4.0 | 81.5 | 6.0 | 12.5 | | |
| 8.0 | 77.5 | 10.0 | 10.0 | | 2.5 |
| 6.2 | 75.0 | 10.0 | 12.5 | 2.5 | |
| 6.3 | 80.0 | 7.5 | 10.0 | 2.5 | |

TABLE II.—VISCOSITY DATA

| Composition in mole percent: | | |
|---|---|---|
| $SiO_2$ | 75.0 | 77.5 |
| $Al_2O_3$ | 12.5 | 10.0 |
| $Cu_2O$ | 12.5 | 12.5 |
| Liquidus, ° C | 1,260 | 1,307 |
| Log viscosity at liquidus | 4.3 | 4.2 |
| Strain point, ° C | 610 | 530 |
| Annealing point, ° C | 640 | 580 |
| Softening point, ° C | 880 | 880 |
| Working point, ° C | 1,305 | 1,350 |

In addition to the desirable foregoing properties, the chemical durability of the sealing glasses is good. The sealing glasses have been observed to have good resistance to water, acids and alkali. Further, such glasses are capable of fabricating vacuum-tight seals having desirable application in the manufacture of vacuum tube envelopes and the like.

The solder glasses, when used for assembling fused quartz parts, are conveniently applied by methods known to the art. These methods include both the hot and cold techniques. When the cold technique is employed, the solder glass is mixed with a vehicle to form a paste. One acceptable vehicle is composed of about 1–2% by weight of nitrocellulose solution in amyl acetate; of course, other vaporizable mediums may be employed as the vehicle. The solder glass, mixed with the vehicle can be manually or mechanically applied by using spatula, extrusion, cold dip, brush, roller coat, spray or doctor blade. In the extrusion method, a tooth paste-like tube can be used to hold and disperse a uniform layer along the sealing edge.

After coating with the sealing glass by any of the above techniques, the coated parts may be dried in an oven, or by heaters. The dry parts, assembled together, are next initimately sealed in an oven at the recommended sealing temperature and then cooled.

While the above example illustrates the application of the sealing glass before heating, it is to be understood that the parts to be assembled could be preheated, dipped and then fired.

The solder glass, when applied by the hot method of application, is usually melted in a suitable container, such as a platinum crucible or the like, to a temperature above the working point. The parts being processed are preheated and dipped into the molten solder glass for about 10 to 20 seconds, withdrawn and allowed to "set" in air for about five to ten seconds. After the parts have cooled to room temperature, they are aligned for assembly, and placed in an oven, heated to the sealing temperature and held at this temperature for a given time and then cooled to room temperature.

The above examples are merely illustrative of conventional sealing techniques, and it is to be understood that the sealing procedures are not intended to be limited to the instant disclosure, as other techniques may be successfully employed.

The following examples are merely illustrative and are not to be construed as limiting the invention.

Example 1

To a four-inch length of fused quartz tubing of one-inch outside diameter was applied a bead of copper sealing glass. The copper sealing glass, consisting of 77.5 mole percent $SiO_2$, 10.0 mole percent $Al_2O_3$ and 12.5 mole percent $Cu_2O$, and characterized by an annealing point of 629° C., a softening point of 570° C., and a density of 2.6001, was first drawn into a fiber, $\frac{1}{16}$ inch to $\frac{1}{32}$ inch diameter, for the beading purposes. After the edge of the quartz tube was beaded, a one-inch diameter by $\frac{1}{16}$ inch thick fused quartz face plate was sealed to the quartz tube. The two parts were sealed together by a hand torch, No. 3 tip, with a normal hydrogen-oxygen flame. Of course, other functionally equivalent flames such as the gas-oxygen flames may be used herein. The hydrogen pressure was five pounds, flow 2.5 c.f.h.; and the oxygen pressure was five pounds, flow 9 c.f.h. At no time was the quartz heated hot enough to glaze the edge of either the quartz tube or the quartz face plate. The formed seal was good, and the solder glass had a good flow and was not adversely affected by the flame.

Example 2

The procedure employed in Example 1 was followed herein, except that the solder glass consisted of 75.0 mole percent of $SiO_2$, 10.0 mole percent $Al_2O_3$, 12.5 mole percent $Cu_2O$, and 2.5 mole percent $Fe_2O_3$. The quartz parts were successfully joined, and the solder glass exhibited good flow and was not adversely affected by the flame.

Example 3

The procedure employed in Example 1 was followed in the instant run, all procedures and techniques were as above described. The solder glass for this run consists essentially of 77.5 mole percent $SiO_2$, 10.0 mole percent $Al_2O_3$, 10.0 mole percent $Cu_2O$, and 2.5 mole percent NiO, and was characterized by an annealing point of 689° C., a softening point of 629° C. and a density of 2.6059. The sealing was successful, and the solder glass exhibited good working characteristics.

Example 4

A fused quartz-to-fused quartz seal was made by sealing a 22 mm. long section of 16 mm. O.D. Vycor tubing to a ¼ inch thick quartz plate. A bead of solder glass, 77.5 mole percent $SiO_2$, 10.0 mole percent $Al_2O_3$, and 12.5 mole percent $Cu_2O$, of about 1 mm. in diameter was laid on the edge of the tubing end, and the surfaces of the bead ground flat on an Alundum polishing blade. The seal was fabricated under a 52.5 gm. load in a ceramic tube furnace, at 2275° F. in a 25% wet nitrogen atmosphere for 15 minutes. The seal produced by this technique withstood subsequent grinding of the plate to the approximate diameter of the tube. There did not appear to be any stress in the quartz due to the seal.

Example 5

The procedure employed in Example 4 was employed for this test, except that the solder glass was applied mixed with a nitrocellulose-amyl acetate vehicle, and the seal was made without the above-mentioned load. The seal produced by this method of application evidenced excellent strength and withstood grinding and sectioning.

Example 6

Other seals were made between quartz-to-quartz surfaces, using the solder glasses described immediately above, wherein the furnace temperature was 2100° F., and in a nitrogen atmosphere for 30 minutes; and wherein the furnace temperature was 2450° F., and in an air atmosphere for 15 seconds. Good results were obtained for seals made by these techniques.

Example 7

To a four-inch length of fused quartz tubing of one-inch outside diameter was applied a bead of copper sealing glass. The copper sealing glass consists of 77 mole percent $SiO_2$, 9.25 mole percent $Al_2O_3$, 12.45 mole percent $Cu_2O$, and 1.3 mole percent $AlF_3$, and characterized by annealing point of 572° C., a strain point of 520° C., and a density of 2.6959, was first drawn into a fiber, $\frac{1}{16}$ inch to $\frac{1}{32}$ inch diameter, for the beading purposes. After the edge of the quartz tube was beaded, a one-inch diameter by $\frac{1}{16}$ inch thick fused quartz plate was sealed to the quartz tube. The two parts were sealed together by a hand torch, No. 3 tip, with a normal gas-oxygen flame. During the beading step, the gas pressure was ½ p.s.i., flow 1.2 c.f.h.; and the oxygen pressure was 5 pounds, flow 7 c.f.h. To work and tool the bead, the flame intensity was increased to a gas flow of 1.8 c.f.h. and an oxygen flow of 10 c.f.h. At no time was the quartz heated hot enough to glaze the edge of either the quartz tube or the quartz face plate. The formed seal was good, and the solder glass had a good flow and was not adversely affected by the flame.

Example 8

A fused quartz-to-fused quartz seal was made by sealing two quartz rods of about one-fourth inch diameter with a powdered sealing glass consisting essentially of about 75 mole percent $SiO_2$, about 10 mole percent $Al_2O_3$, about 12.5 mole percent $Cu_2O$, and about 2.5 mole percent $Fe_2O_3$. The powdered glass had a mesh size of about 100 and was mixed with water to form a paste. The layer of solder glass between the two rods had a thickness of about 0.020 to about 0.030 inch. The seal was effected by heating for 2.5 minutes in an oven at a temperature of about 2380° F., and in an atmosphere of 40 cubic feet per hour of dry nitrogen. Following the sealing of the fused quartz rods, the seal was annealed in an air atmosphere at 690° C. for 15 minutes. The successful seal exhibited a stress, expressed in pounds per square inch, of about 650T as measured by conventional polarimeter techniques.

Example 9

The procedure employed in Example 8 was followed for this run. The sealing glass as used for this run consists essentially of about 77.5 mole percent $SiO_2$, about 10.0 mole percent $Al_2O_3$, and about 12.5 mole percent $Cu_2O$. The oven temperature for this run was about 2350° F., and the sealing time was about three minutes. The seal was annealed in a nitrogen atmosphere for 15 minutes at 633° C. and had a stress, p.s.i., of about 270T as determined by conventional laboratory polarimeter methods.

Example 10

Three additional runs were performed following the procedure and using the glass composition of Example 9. The seals exhibited stress of about 400T, 540T, and 520T as quantitatively measured by polarimeter techniques.

Example 11

The procedure of Examples 9 and 10 was repeated except that the powdered glass was mixed with a nitrocellulose amyl acetate vehicle, and the oven temperature for three instant runs was about 2350° F., 2380° F., and 2360° F. The seals exhibited stresses of about 440T, 350T, and 310T.

Example 12

The procedure of Examples 9 and 10 was repeated in this run, except that argon was substituted for nitrogen in the oven atmosphere. The oven had a temperature of about 2380° F. and the polarimeter measured stress for three seals under the argon atmosphere was about 680T, 550T, and 530T.

Example 13

A fused quartz-to-fused quartz seal was made by sealing two quartz rods with a powdered sealing glass consisting essentially of 77 mole percent $SiO_2$, 9.25 mole percent $Al_2O_3$, 12.45 mole percent $Cu_2O$, and 1.3 mole percent $AlF_3$. The powdered glass was mixed with water to form a moist paste. The layer of solder glass between the two rods had a thickness of about 0.020 to 0.030 inch. The seal was effected by heating for about 3 minutes in an oven at a temperature of 2350° F., and in a dry nitrogen atmosphere with a typical flow of 40 cubic feet per hour. Following the sealing of the fused quartz rods, the seals were annealed at 580 to 600° C. for about 15 minutes. The seal exhibited a stress, expressed in pounds per square inch, of 250T as measured by conventional polarimeter techniques.

Example 14

The procedure employed in Example 13 was followed for this run. The sealing glass consisted essentially of the components above listed. The seal for this run had a thickness of about 0.192 inch, and it was annealed in a nitrogen atmosphere for 15 minutes. The seal exhibited stress of about 350T as measured by polarimeter techniques.

Example 15

A fused quartz-to-fused quartz seal was made by sealing a piece of 16 mm. O.D. Vycor tubing to a ¼ inch quartz plate. A bead of solder glass consisting of 77 mole percent $SiO_2$, 9.25 mole percent $Al_2O_3$, 12.45 mole percent $Cu_2O$, and 1.3 mole percent $AlF_3$ of about 1 mm. in diameter was laid on the edge of the tubing end, and the surface of the bead ground flat on an Alundum polishing blade. The seal was fabricated under a 52 gm. load in a ceramic tube furnace at about 2250° F. in a 25% wet nitrogen atmosphere. The seal produced by this technique withstood subsequent grinding and there did not appear to be any stress in the quartz due to the seal.

The seals made in accordance with the foregoing disclosure and examples were tested by standard evaluation tests to demonstrate the results of the present fused quartz-to-fused quartz seals. Seals prepared by the above examples were subject to a thermal shock test. This test consists of an up-shock and a down-shock. The up-shock test consists in taking a sealed product from a room temperature of about 75° F. and rapidly placing the sealed surfaces into a furnace with a temperature of about 500° C. The down-shock test consists of taking a sealed product from a furnace at about 500° C. and rapidly plunging the seal into an ice-water bath of about 32° F. This test indicates if a given seal will perform satisfactorily or if there will be thermal shock failure as evidenced by breaking, crazing, cracks or the like. Seals, made by sealing fused quartz to fused quartz wherein the soldering frit consisting of 77.5 mole percent $SiO_2$, 10.0 mole percent $Al_2O_3$, and 12.5 mole percent $Cu_2O$, and seals made by employing the solder glass mixed with a vehicle, said glass frit consisting of 77.5 mole percent $SiO_2$, 10.0 mole percent $Al_2O_3$, and 12.5 mole percent $Cu_2O$, and frits containing 75.0 mole percent $SiO_2$, 10.0 mole percent $Al_2O_3$, 12.5 mole percent $Cu_2O$, and 2.5 mole percent $Fe_2O_3$, were subjected to the thermal shock-up and the thermal shock-down tests. The seals tested by this technique performed satisfactorily, and there was no evidence of breaking, crazing, cracking or the like. Such tests further indicate the low-stress condition of such seals. Further evidence of good sealability is readily apparent from the tension studies performed for a sealing composition containing 77.5 mole percent $SiO_2$, 10.0 mole percent $Al_2O_3$, and 12.5 mole percent $Cu_2O$, wherein the measured stress in the seal-to-fused quartz was about 180 p.s.i. tension.

As is evident from the above examples and discussions, it is self-evident that glass frits of the present invention exhibited excellent properties for fabricating fused quartz-to-fused quartz seals, fused silica-to-fused silica seals, and for fused quartz or fused silica-to-metal seals and the like; and that the instant essentially alkali-free low expansion silicate glasses represent a significant achievement for the structural approach to quartz-seal technology.

We claim:

1. An article of manufacture comprising a fused quartz surface coated with a bonding material wherein said bonding material is a solder glass having the following range in composition:

| Component: | Mole percent |
| --- | --- |
| $SiO_2$ | 50–90 |
| $Al_2O_3$ | 5–30 |
| $Cu_2O$ | 5–30 |
| $NiO$ | 0–6 |
| $Fe_2O_3$ | 0–6 |
| $AlF_3$ | 0–6 |

2. The article of manufacture according to claim 1 wherein said solder glass has the following composition:

| Component: | Mole percent |
| --- | --- |
| $SiO_2$ | 75–80 |
| $Al_2O_3$ | 8–13 |
| $Cu_2O$ | 8–13 |
| $NiO$ | 0–2.5 |
| $Fe_2O_3$ | 0–2.5 |
| $AlF_3$ | 0–2.5 |

3. The article of manufacture according to claim 1 wherein the solder glass has the following composition:

| Component: | Mole percent |
|---|---|
| $SiO_2$ | 75 |
| $Al_2O_3$ | 12.5 |
| $Cu_2O$ | 12.5 |

4. The article of manufacture according to claim 1 wherein said solder glass has the following composition:

| Component: | Mole percent |
|---|---|
| $SiO_2$ | 77.5 |
| $Al_2O_3$ | 10.0 |
| $Cu_2O$ | 12.5 |

5. The article of manufacture according to claim 1 wherein said solder glass has the following composition:

| Component: | Mole percent |
|---|---|
| $SiO_2$ | 75.0 |
| $Al_2O_3$ | 10.0 |
| $Cu_2O$ | 12.5 |
| $Fe_2O_3$ | 2.5 |

6. The article of manufacture according to claim 1 wherein said solder glass has the following composition:

| Component: | Mole percent |
|---|---|
| $SiO_2$ | 77.5 |
| $Al_2O_3$ | 10.0 |
| $Cu_2O$ | 10.0 |
| NiO | 2.5 |

7. The article of manufacture according to claim 1 wherein said solder glass has the following composition:

| Component: | Mole percent |
|---|---|
| $SiO_2$ | 75–80 |
| $Al_2O_3$ | 8–13 |
| $Cu_2O$ | 8–13 |
| $AlF_3$ | 0–2.5 |

8. The article of manufacture according to claim 1 wherein said solder glass has the following composition:

| Component: | Mole percent |
|---|---|
| $SiO_2$ | 77–78 |
| $Al_2O_3$ | 9–10 |
| $Cu_2O$ | 12–13 |
| $AlF_3$ | 1–3 |

9. The article of manufacture according to claim 1 wherein said solder glass has the following composition:

| Component: | Mole percent |
|---|---|
| $SiO_2$ | 77.00 |
| $Al_2O_3$ | 9.25 |
| $Cu_2O$ | 12.45 |
| $AlF_3$ | 1.30 |

10. An article of manufacture comprising a fused quartz surface coated with bonding material wherein said bonding material is a solder glass having the following range in composition:

| Component: | Mole percent |
|---|---|
| $SiO_2$ | 50–94 |
| $Al_2O_3$ | 0.5–30 |
| $Cu_2O$ | 1.5–35 |
| $AlF_3$ | 0–6 |

11. A composite article of manufacture comprising two fused quartz surfaces intimately bonded together by an intermediate layer of bonding material, said bonding material comprising a solder glass having the following range in composition:

| Component: | Mole percent |
|---|---|
| $SiO_2$ | 50–90 |
| $Al_2O_3$ | 5–30 |
| $Cu_2O$ | 5–30 |
| NiO | 0–6 |
| $Fe_2O_3$ | 0–6 |
| $AlF_3$ | 0–6 |

12. The composite article according to claim 11 wherein said solder glass has the following composition:

| Component: | Mole percent |
|---|---|
| $SiO_2$ | 75–80 |
| $Al_2O_3$ | 8–13 |
| $Cu_2O$ | 8–13 |
| NiO | 0–2.5 |
| $Fe_2O_3$ | 0–2.5 |
| $AlF_3$ | 0–2.5 |

13. The composite article according to claim 11 wherein said solder glass has the following composition:

| Component: | Mole percent |
|---|---|
| $SiO_2$ | 75.0 |
| $Al_2O_3$ | 12.5 |
| $Cu_2O$ | 12.5 |

14. The composite article according to claim 11 wherein said solder glass has the following composition:

| Component: | Mole percent |
|---|---|
| $SiO_2$ | 77.5 |
| $Al_2O_3$ | 10.0 |
| $Cu_2O$ | 12.5 |

15. The composite article according to claim 11 wherein said solder glass has the following composition:

| Component: | Mole percent |
|---|---|
| $SiO_2$ | 75.0 |
| $Al_2O_3$ | 10.0 |
| $Cu_2O$ | 12.5 |
| $Fe_2O_3$ | 2.5 |

16. The composite article according to claim 10 wherein said solder glass has the following composition:

| Component: | Mole percent |
|---|---|
| $SiO_2$ | 75–80 |
| $Al_2O_3$ | 8–13 |
| $Cu_2O$ | 8–13 |
| $AlF_3$ | 0–2.5 |

17. The composite article according to claim 10 wherein said solder glass has following composition:

| Component: | Mole percent |
|---|---|
| $SiO_2$ | 77–78 |
| $Al_2O_3$ | 9–10 |
| $Cu_2O$ | 12–13 |
| $AlF_3$ | 1–3 |

18. The composite article according to claim 10 wherein said solder glass has the following composition:

| Component: | Mole percent |
|---|---|
| $SiO_2$ | 77.0 |
| $Al_2O_3$ | 9.25 |
| $Cu_2O$ | 12.45 |
| $AlF_3$ | 1.3 |

19. The composite article according to claim 11 wherein said solder glass has the following composition:

| Component: | Mole percent |
|---|---|
| $SiO_2$ | 75.5 |
| $Al_2O_3$ | 10.0 |
| $Cu_2O$ | 10.0 |
| NiO | 2.5 |

20. A composite article of manufacture comprising two fused quartz surfaces intimately bonded together by an intermediate layer of bonding material, said bonding material comprising a solder glass having the following range in composition:

| Component: | Mole percent |
|---|---|
| $SiO_2$ | 50–94 |
| $Al_2O_3$ | 0.5–30 |
| $Cu_2O$ | 1.5–35 |
| $AlF_3$ | 0–6 |

References Cited

UNITED STATES PATENTS 2,642,633  6/1953  Dalton _____ 161—196

ROBERT F. BURNETT, *Primary Examiner.*

WILLIAM J. VAN BALEN, *Assistant Examiner.*